Aug. 30, 1966 W. F. O'SHEA ET AL 3,270,149
SLIDE SWITCH CONSTRUCTION INCLUDING LATERAL ARM AND DETENT STRUCTURE
Filed Feb. 25, 1966
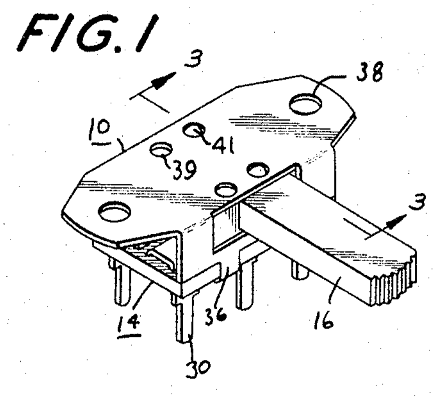
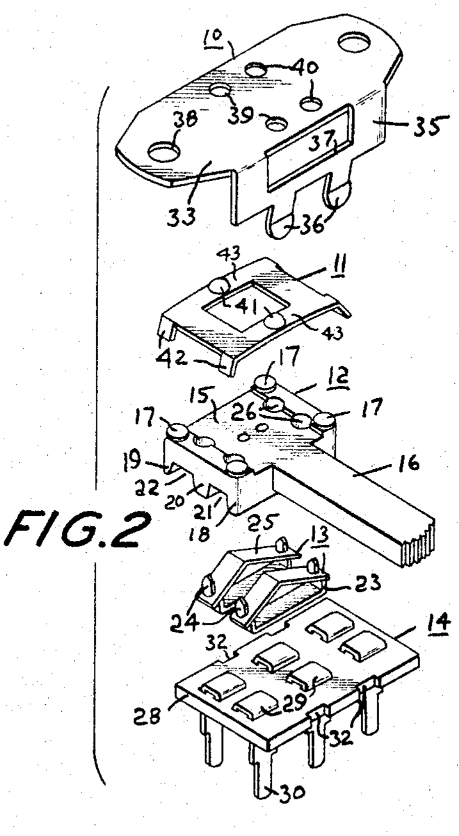
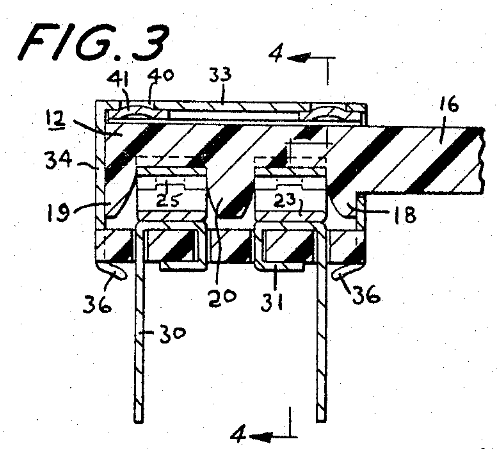
FIG. 4
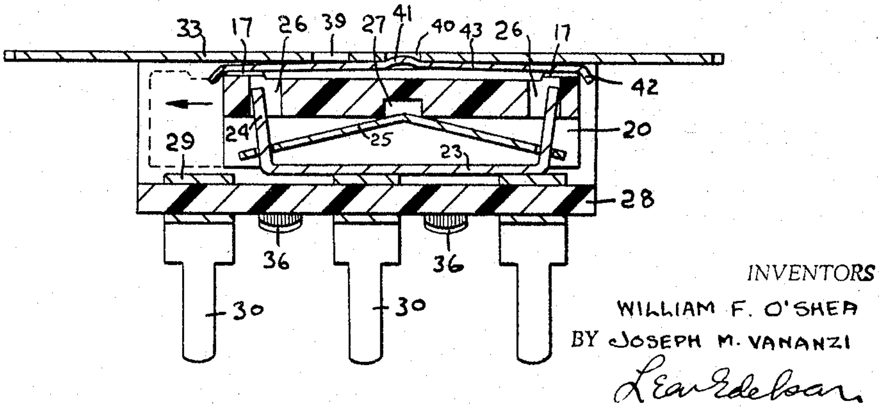
INVENTORS
WILLIAM F. O'SHEA
BY JOSEPH M. VANANZI
Leo Edelson
ATTORNEY United States Patent Office 3,270,149

Patented August 30, 1966

3,270,149
SLIDE SWITCH CONSTRUCTION INCLUDING LATERAL ARM AND DETENT STRUCTURE

William F. O'Shea, Willow Grove, and Joseph M. Vananzi, Meadowbrook, Pa., assignors to Continental-Wirt Electronics Corporation, Philadelphia, Pa., a corporation of Pennsylvania Filed Feb. 25, 1966, Ser. No. 530,210
8 Claims. (Cl. 200—16)

This invention relates generally to slide switches, and more particularly relates to a novel slide switch so constructed that the actuating arm or button extends laterally through the side of the switch casework and is of sufficient length that it may be projected directly through an appropriate cut-out in the control panel of apparatus for direct actuation.

Previous types of slide switches have utilized operating arms or buttons accessible through the top of the case work of the switch and opposite to the switch external contact portions which normally project from the insulating contact base of the switch. When used in applications requiring direct contact mounting to a printed circuit board, reasonable servicing requirements do not permit the printed circuit board to be mounted parallel to and very close to the front panel through which the operating arm for the slide switch would have to pass in order to be actuatable. Consequently, with the printed circuit boards positioned in normal fashion substantially perpendicular to the panel of the apparatus, it has been necessary to employ auxiliary mechanical devices to actuate from the panel surface such a slide switch, which is of course mounted with its operating arm or button behind the panel. Accordingly, it is a primary object of our invention to provide a novel slide switch having an extended slider arm projecting through the switch case sidewall substantially at right angles to the normal downward projection direction of the external parts of the switch contacts.

Another object of our invention is to provide a novel slide switch as aforesaid wherein the length of the laterally projecting slide switch actuating arm is sufficiently long to project directly through the control panel of the apparatus in which the switch is utilized to thereby eliminate the need for supplemental mechanical devices otherwise required to actuate the switch.

The foregoing and other objects of our invention will appear more fully hereinafter from a reading of the following specification in conjunction with an examination of the appended drawing, wherein:

FIGURE 1 is a perspective view of the assembled slide switch according to the invention clearly showing the novel lateral extension of the actuating arm;

FIGURE 2 is an exposed perspective view of the switch shown in FIGURE 1 illustrating structural features of the interior parts of the switch not visible in FIGURE 1;

FIGURE 3 is a vertical cross sectional view on an enlarged scale through the switch of FIGURE 1 as would be seen when viewed along the line 3—3 thereof; and FIGURE 4 is a vertical sectional view through the slide switch taken at right angles to the showing of FIGURE 3 and as would be seen when viewed along the line 4—4 of FIGURE 3.

In these several figures, like elements are denoted by like reference characters.

Referring now to the drawing, it is seen that the switch includes a case 10, a detent pressure plate 11 disposed between the undersurface of the case top wall and the immediately below lying switch slider element 12, a pair of electrically conductive slider contact bridges 13 shiftable with the slider 12 and held captive between the latter and the below lying contact assembly 14.

The slider 12 is made of electrical insulating material and has a generally rectangular body portion 15 from one side of which projects an elongated slider actuating arm 16. Projecting upward from each of the four corners of the upper face of the slider body 15 is a boss 17. Depending from the side edge of the slider body from which extends the slider arm 16 is a skirt 18, a similar skirt 19 depending from the slider body 15 at the opposite parallel extending edge thereof. Depending from the underside of the slider body 15 parallel to the front and rear skirts 18 and 19 and midway therebetween is a central barrier rib 20 which defines with the front skirt 18 the side edges of a channel 21, and which defines with the rear skirt 19 a channel 22. Within these channels the slider contact bridges 13 are disposed as most clearly seen in FIGURES 3 and 4.

The contact bridges 13 are each formed from a U shaped metal conductor having a flat base wall 23 and upturned side arms reduced at the upper ends thereof as at 24 so that the latter are projectable through opposite end apertures cut or punched through the ends of an inverted V shaped resilient biasing element 25. The slider contact bridges 13 are held captive in the slider body channels 21 and 22 by projecting of the reduced side arm upper ends 24 into apertures 26 formed in the slider body 15 at opposite ends thereof and opening into each of the channels 21 and 22 as is most clearly seen from FIGURES 2 and 4. The upper upwardly facing vertex of the inverted V resilient biasing elements 25 are each disposed in a slot 27 formed in the undersurface of the slider body 15 and extending transversely of each of the channels 21 and 22 at their mid points.

The contact assembly 14 is formed from a rectangular piece of insulating material, such as phenolic board, 28 suitably apertured to have projected therethrough a plurality of electrical contacts each having a flat head surface portion 29, a depending tail 30 and a contact locking tab 31, best seen in FIGURE 3, which locks the contact to the insulator baseboard 28. As best seen in FIGURES 3 and 4, the bases 23 of the contact bridges 13 seat downward upon the heads 29 of the contacts and are resiliently biased downward thereagainst by means of the resilient biasing elements 25. The front and rear edges of the contact assembly insulation baseboard 28 are provided with notches 32 to receive the locking ears carried by the case 10.

The case 10 includes a top wall 33, rear wall 34 and a front wall 35, the front and rear walls depending from the top wall and being provided at their lower edges with a pair of locking ears 36 positionable in the notches 32 of the contact assembly, as best seen in FIGURES 3 and 4. The case front wall 35 is rectangularly apertured as at 37 to permit passage therethrough of the slider arm actuator 16. The case top wall 33 is provided with apertures at opposite ends thereof to function as optional mounting holes 38 for the switch assembly, and the top wall is also apertured as at 39 and 40 with detent receiving holes into which resiliently snap the raised detents 41 which extend upward from the detent pressure plate 11.

The pressure plate 11 is in the general form of a resilient rectangular annulus provided at opposite ends with depending tabs 42. As best seen from FIGURE 4, the length of the pressure plate 11 is equal to the length of the slider body 15 so that with the pressure plate seated downward upon the slider body and resting upon the corner bosses 17, the pressure plate tab 42 bracket the slider body 15 and prevent relative sliding movement between the slider body and pressure plate. As also best seen in FIGURE 17, the slider body bosses 17 maintain the resilient detent carrying arms 43 of the pressure plate 11 above and out of contact with the upper surface of the slider body 15 so that the detents 41 may shift vertically to be engaged in and disengaged from the detent apertures 39 and 40 formed in the top wall of the case 33. The pressure plate 11 is slightly bowed so that the tab ends of the pressure plate press downward on the slider body bosses 17 when the detents 41 are engaged with the case top wall 33 in either detented position and therebetween.

Having now described our invention in connection with a particularly illustrated embodiment thereof it will be appreciated that variations and modifications of our invention may now occur from time to time to those persons normally skilled in the art without departing from the essential scope or spirit of the invention, and accordingly it is intended to claim the same broadly as well as specifically as indicated by the appended claims.

What is claimed to be new and useful is:

1. A slide switch, comprising in combination, a contact assembly including an insulating base member and a plurality of electrically conductive contact elements carried by said base member, a slider element overlying said contact assembly having a body portion made of electrical insulating material and an actuating arm extending laterally therefrom with at least one electrically conductive contact bridge held captive to the underpart of said slider body so as to move with and mechanically engage a pair of contact elements of said contact assembly, a case enclosing said slider element and having a top wall and depending front and rear walls, said case top wall overlying said slider body and said case front and rear walls extending downward immediately in front of and behind said slider element body to the insulating base member of said contact assembly and being locked to the latter by locking ears carried by said case front and rear walls, and a detent pressure plate overlying said slider body and disposed between said slider body and said case top wall, said case front wall being apertured and having projected therethrough said slider element actuating arm, said actuating arm being narrower than said case front wall aperture so that said arm and the slider body may be shifted laterally with respect to said contact assembly and case for a distance determined by the length of said case front wall aperture between at least two detented positions to thereby shift the switch from one contact condition to another, the length of said actuating arm being sufficiently long to project completely through and be operable from one side of a panel when the remainder of the switch structure is disposed on the opposite side of the panel.

2. A slide switch comprising in combination, a contact assembly including an insulating base member carrying a plurality of electrically conductive contact elements each of which latter have a contact head exposed from above the insulating base member and a tail which projects downward through and beyond the bottom of said base member, a slider element overlying said contact assembly having a body portion made of electrical insulating material and an actuating arm extending laterally therefrom substantially orthogonally to the downwardly extending tails of the contact elements, as least one electrically conductive contact bridge held captive to the underpart of said slider body so as to move therewith and mechanically engage the contact heads of a pair of contact elements of said contact assembly, a case enclosing said slider element and having a top wall and depending front and rear walls, said case top wall overlying said slider body and said case front and rear walls extending downward immediately in front of and behind said slider element body to the insulating base member of said contact assembly an being locked to the latter by locking ears carried by said case front and rear walls, and a detent pressure plate overlying said slider body and disposed between said slider body and said case top wall, said case front wall being apertured and having projected therethrough said slider element actuating arm, said actuating arm being narrower than said case front wall aperture so that said arm and the slider body may be shifted laterally with respect to said contact assembly and case for a distance determined by the length of said case front wall aperture between at least two detented positions to thereby shift the switch from one contact condition to another, the length of said actuating arm being sufficiently long to project completely through and be operable from one side of a panel when the remainder of the switch structure is disposed on the opposite side of the panel.

3. A slide switch as defined in claim 2 wherein said slider body and actuating arm are unitarily formed of electrical insulating material.

4. A slide switch as defined in claim 2 wherein the upper face of said slider body is formed with a plurality of bosses extending upward therefrom proximate to the opposite ends thereof, wherein said detent pressure plate at opposite ends is seated upon said bosses and is free of contact with said slider body therebetween and is provided with upwardly extending detent projections proximate to the midpoint of said detent plate between said slider bosses, and wherein said case top wall is provided with detent projection receiving apertures into which said detent plate detent projections snap when said slider is moved to each of its detented positions.

5. A slide switch, comprising in combination, a contact assembly including an insulating base member and a plurality of electrically conductive contact elements carried by said base member, a slider assembly overlying said contact assembly having a body portion made of electrical insulating material and an actuating arm extending laterally therefrom, said slider assembly including at least one electrically conductive contact bridge held captive to the underpart of said slider body so as to move with mechanically engage a pair of contact elements of said contact assembly, a case enclosing said slider assembly and having a top wall and depending front and rear walls, said case top wall being disposed flatwise above and said case front and rear walls extending downward in embracing relation to said slider assembly, and means for locking said case to said contact assembly while permitting free movement of said slider assembly within said casing, said case front wall being apertured and having projected therethrough said slider actuating arm, said actuating arm being narrower than said case front wall aperture so that said arm and the slider body may be shifted laterally with respect to said contact assembly and case for a distance determined by the length of said case front wall aperture between at least two selectively different positions to thereby shift the switch from one contact condition to another, the length of said actuating arm being sufficiently long to project completely through and be operable from one side of a panel when the remainder of the switch structure is disposed on the opposite side of the panel.

6. A slide switch as defined in claim 5 including detent means for frictionally holding said slider assembly in any one of said select ively different positions.

7. A slide switch as defined in claim 5 wherein said case conjointly forms with said contact assembly an elongated hollow enclosure of substantially rectangular form in transverse cross-section within which said slider assembly is shiftable as a unit from one contact position to another.

8. A slide switch as defined in claim 7 including spring-pressed means disposed between said hollow enclosure and said slider assembly for frictionally retaining said slider assembly in its selected contact position.

References Cited by the Examiner

UNITED STATES PATENTS

| | | | |
|---|---|---|---|
| 2,725,432 | 11/1955 | Brown | 200—116 |
| 2,880,284 | 3/1959 | Laete | 200—16 |

ROBERT K. SCHAEFER, *Primary Examiner.*